United States Patent
Onose

[11] Patent Number: 6,036,371
[45] Date of Patent: Mar. 14, 2000

[54] ROLLING BEARING UNIT FOR VEHICLE WHEEL

[75] Inventor: Yoshiaki Onose, Fujisawa, Japan

[73] Assignee: NSK Ltd., Tokyo, Japan

[21] Appl. No.: 09/157,223

[22] Filed: Sep. 18, 1998

[51] Int. Cl.[7] .................................................. F16C 19/49
[52] U.S. Cl. ....................... 384/494; 384/544; 301/105.1; 464/178
[58] Field of Search .................... 384/494, 452, 384/544, 589; 301/105.1, 124.1; 464/178, 904, 906; 180/258, 259

[56] References Cited

U.S. PATENT DOCUMENTS

| | | | |
|---|---|---|---|
| 2,010,965 | 8/1935 | Scrivener | 384/494 |
| 4,248,487 | 2/1981 | Asberg . | |
| 4,880,281 | 11/1989 | Merkelbach . | |
| 4,921,362 | 5/1990 | Werner | 384/494 |
| 5,941,335 | 8/1999 | Krisher | 180/255 |

FOREIGN PATENT DOCUMENTS

| | | |
|---|---|---|
| 19547981 | 7/1996 | Germany . |
| 10-9258 | 1/1998 | Japan . |
| 10-9259 | 1/1998 | Japan . |

Primary Examiner—Thomas R. Hannon
Attorney, Agent, or Firm—Helgott & Karas, P.C.

[57] ABSTRACT

A rolling bearing unit for a vehicle wheel comprising an outer ring formed with first and second outer ring raceways, a hub formed with a first inner raceway, and with a housing portion for an outer ring of a constant velocity joint, an inner ring formed with a second inner ring raceway and fitted onto the middle portion of the hub, and a plurality of rolling members rotatably provided in rows between the first and second outer ring raceways and the first and second inner ring raceways to rotatably support the hub and inner rings inside the outer ring, balls being used for the rolling members for the row with respect to the first inner ring raceway while rollers being used for the rolling member row with respect to the second inner ring raceway, so that the basic dynamic load rating of the rolling member row on the axial inside is larger than that of the rolling member row on the axial outside whereby the lives of the double row rolling member rows are equalized.

2 Claims, 2 Drawing Sheets

ROLLING BEARING UNIT FOR VEHICLE WHEEL

FIELD OF THE INVENTION

The present invention relates to a rolling bearing unit for a vehicle wheel for rotatably supporting a driven wheel such as a from wheel of the FF vehicle (front engine front wheel drive vehicle) and of the 4 WD vehicle (four wheel drive vehicle) with reference to a suspension.

BACKGROUND OF THE INVENTION

Various kinds of rolling bearing units for vehicle wheel comprising outer and inner rings rotatably combined with each other through rolling members are used to rotatably support a vehicle wheel to a suspension. The rolling bearing unit for rotatably supporting a driven wheel, that is also a steering wheel, such as a front wheel of the FF vehicle or of the 4 WD vehicle is combined with a constant velocity joint to transmit smoothly the rotation of the driving shaft to the vehicle wheel, keeping the constant velocity property, regardless of the steering angle of the vehicle wheel.

JP Utility Model Publication KOKAI NO. S61-113103 discloses a conventional rolling bearing unit for vehicle wheel combined with a constant velocity joint, which can be relatively compact and lightweight.

FIG. 2 shows the conventional structure disclosed in this publication. An outer ring or race 1 is supported by the suspension so as not to rotate when incorporated in the vehicle, and formed with a first mount, flange 2 in a radially outward flange shape on its outer peripheral surface to be supported by the suspension and with first and second outer ring raceways 3, 4 in double rows on its inner peripheral surface. A hub 5 and first and second inner rings 6, 7 are provided on the radially inside of the outer ring 1. On the outer peripheral surface of the hub 5, at a portion closer to the axially outer end, a flange 8 is provided to support a vehicle wheel to the hub 5, and integrally formed with the hub 5.

The terms "axially outer" and "axially outside" mean the widthwise outside when installed in the vehicle, left in FIGS. 1 and 2 while the terms "axially outer" and "axially inside" mean the widthwise inside when installed in the vehicle, right in FIGS. 1 and 2, in the present specification.

A plurality (usually 4 to 6) of studs 9 are provided circumferentially with a uniform interval with the base ends thereof axially press-fitted into the flange 8. When mounting the vehicle wheel to the suspension, the vehicle wheel is fixedly supported by the flange 8 with the studs 9.

The hub 5 has an axially inner end portion for a housing portion 11 to be the outer ring of the constant velocity joint 10.

The hub 5 has a middle portion onto which first and second inner rings 6, 7 are fitted with first and second inner ring raceways 12, 13 in double rows formed on their outer peripheral surfaces. A plurality of rolling members 14 are provided between the first and second outer ring raceways 3, 4 and the first and second inner ring raceways 12, 13 to rotatably support the hub 5 and the first and second inner rings 6, 7 inside the outer ring 1.

The annular space where the rolling members 14 are provided has opposite opening portions, where the gaps between the opening portions on the opposite ends of the outer ring 1 and the outer peripheral surface of the first inner ring 5 at the axially outer end and the outer peripheral surface of the second inner ring 6 at the axially inner end are covered by seat rings 15, respectively.

The outer peripheral surface of the hub 5 is formed generally circumferentially with an anchoring groove 16 at a portion in the middle portion on the side of the axially inner end, and a stop ring 17 having a semicircular shape is anchored in the anchoring groove 16.

The flange 8 has a step portion 18 at the base end thereof on the axial inside, and the first and second inner rings 6, 7 are supported from the opposite axial sides by the stop ring 17 and the step portion 18. In this state, the stop ring 17 prevents the first and second Miner rings 6, 7 from moving toward the axial inside of the hub 5.

A boot 19 made from a resilient member such as rubber, synthetic resin, and in a bellows shape is provided such that die axially outer end portion of the boot 19 is fitted onto on the outer peripheral surface at the axially inner end of the housing portion 11. The axially outer end portion of the boot 19 is formed with a cylindrical portion which is fitted onto the axially inner end portion of the housing portion 11 and retained by the retaining band 20.

Formed on the outer peripheral surface at the axially inner end portion of the housing portion 11 are engagement grooves 21 which are generally circumferentially engaged with the inner peripheral surface at the axially inner end portion of the boot 19.

The other end of the boot 19 is tightly connected to the outer peripheral surface (not shown) at the middle portion of the drive shaft 22 rotatably driven by the engine through the transmission.

The boot 19 isolates the inner space of the housing portion 11 from outside and prevents the grease in this inner space from leaking out to the outside, and the foreign matter such as rain water, dust from entering this inner space.

When incorporating the front wheel or driven wheel to the vehicle using the rolling bearing unit constructed as mentioned above, the outer ring 1 is fixedly supported by the suspension by way of the mount flange 2, and the front wheel is fixedly supported by the hub 5 by way of the flange 8.

The drive shaft 22 is rotated by the engine through the transmission and the tip end of the drive shaft 22 is engaged in a spline joint with the inside of the inner member or ring 23 of the constant velocity joint 10.

When the vehicle is moving, the rotation of the inner ring 23 is transmitted to the hub 5 through the balls 24 to rotate the driven wheel, e.g. front wheel.

On the other hand, DE 19547981 (U.S. Ser. No. 365,354 filed in 1994 with claiming priority) discloses an example of rollers used for the rolling members on both of the axial inside and outside.

There is a problem in the conventional structure as shown in FIG. 2 as follows; specifically in the case of the conventional structure, the rolling bearings in double rows provided inside the outer ring 1 supported by the suspension to rotatably support the hub 5 with, the vehicle wheel fixed thereto, have the common structures and dimensions in the rolling member row portions. Therefore, the rolling member row portions have the same basic dynamic load rating. In the case of the double row rolling bearing unit, if the same load is added to the rolling member row portions, the rolling member row portions have the substantially same life. However, in the generally used automobiles, the rolling member row portions are subjected to different loads, such that the load applied to the axially inner rolling member row portion (right row in FIG. 2) is larger than the load applied to the axially outer rolling member row portion (left row in FIG. 2).

In addition, the rolling member row portion on the axial inside is placed close to the constant velocity joint, and subjected to more severe use conditions, e.g. heat generation and load from the constant velocity joint, than the rolling member row portion on the axial outside.

Accordingly, the life of the axially inner rolling member row portion is shorter than the life of the axially outer rolling member row portion, which is not desirable on the design of the rolling bearing unit. For example, the construction parts are not effectively utilized.

If the diameter of the balls for the rolling members on the axial inside is made larger, or if the number of the balls for the rolling members on the axially inside is increased, to substantially equalize the lives of the both rolling member row portions, the diameter of the bearing section would be become larger, which is not desirable for design.

The structure of FIG. 1 of DE 19547981A1 where the rollers are used for the rolling members, would be more costly than the case where the balls are used for the rolling members.

SUMMARY OF THE INVENTION

Under such situation, an object of the present invention is to provide a rolling bearing unit for a vehicle wheel, wherein the rolling member row portions have the substantially equal lives and which is produced at a lower cost without enlarging the outer diameter.

PREFERRED EMBODIMENTS OF THE PRESENT INVENTION

Figure 1:
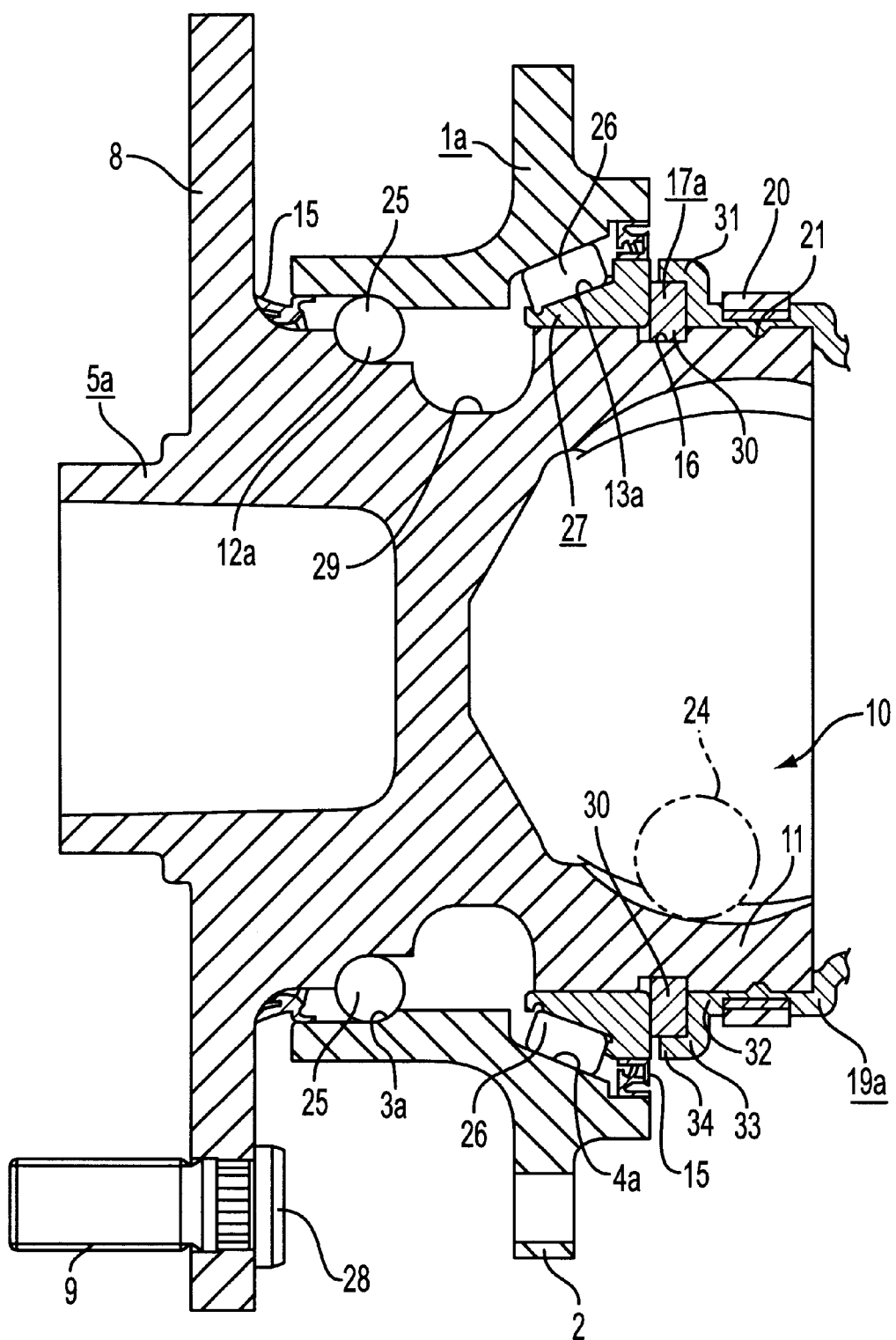
FIG. 1 is a cross sectional view of a first example of the embodiments of the rolling bearing unit according to the present invention.

The rolling bearing unit for the vehicle wheel of the present invention comprises, as in the conventional structure as mentioned above, an outer ring having an outer peripheral surface formed with a mount portion to be supported by the suspension and an inner peripheral, surface formed with first and second outer ring raceways, a hub having an outer peripheral surface which is, at its axially outer end portion axially projecting from the outer ring, formed with a flange to support a vehicle wheel, and at its middle portion, with a first inner ring raceway, and at the other end portion, with a housing portion to be the outer ring or member for the constant velocity joint, an inner ring having an outer peripheral surface formed with a second inner ring raceway and fitted onto the middle portion of the hub on the side of the other end than the first inner the raceway, and a plurality of rolling members rotatably provided between the first and second outer ring raceways and the first and second inner ring raceways to rotatably support the hub and the inner rings inside the outer ring.

Specifically, in the rolling bearing unit for vehicle wheel of the present invention, balls are used for the rolling members in the rolling member row with respect to the first inner ring raceway while rollers are used for the rolling members in the rolling member row with respect to the second inner ring raceway.

When the inner diameter of the inner ring is equal to the outer diameter of the outer ring in the bearing, the basic dynamic load rating (e.g. 5,000 kgf, 8,000 kgf, 10,000 kgf) of the conical roller bearing is at least twice the basic dynamic load rating of the angular ball bearing. Provided that the diameter of the rollers of the conical roller bearing is reduced so that the basic dynamic load rating of the conical roller bearing is 1.2 times the basic dynamic load rating (e.g. 2,000 kgf, 3,000 kgf, 4,000 kgf) of the angular ball bearing (since a clearance is produced with the roller diameter reduced, the number of rollers is increased by that amount), the diameter of the rollers can be decreased by 30%, and the length of the rollers is made shorter by 30%.

The reason why the basic dynamic load rating of the conical roller bearing is 1.2 times the basic dynamic load rating of the angular ball bearing is as follows:

As mentioned above, the load applied to the rolling member row portion on the axial inside is larger than the load applied to the rolling member row portion on the axial outside. In addition, the rolling member row portion on the axial inside is subjected to the heat generation and load from the constant velocity joint, so that the higher basic dynamic load rating is required in the rolling member row portion on the axial inside.

Under such conditions, the diameter of the rollers of the conical roller bearing (e.g. 3 mm, 4 mm, 5 mm, 6 mm) is a half of the diameter (e.g. 6 mm, 8 mm, 10 mm, 12 mm) of balls in the angular ball bearing.

The ratio (D/Da) of the roller diameter D to the ball diameter Da is in the range from 0.5 to 1, e.g. 0.6, 0.7, 0.8 or 0.9, so that the unit can be made more compact comparing, with the case where the balls are used in the both rolling member rows.

The angular ball bearing mentioned above has the contact angle set at 20 degrees, 25 degrees, 30 degrees, 35 degrees or 40 degrees, while the conical roller bearing mentioned above has the contact angle set at 10 degrees, 15 degrees, 20 degrees, 25 degrees or 30 degrees.

In addition, the pitch circle diameter of the balls for the rolling members in the first inner ring raceway is smaller than the pitch circle diameter of the rollers for the rolling members in the second inner ring raceway.

The constant velocity joint section is located on the radially inside of the surface of the second inner ring raceway. In other words, the diameter of groove of the constant velocity joint is smaller than the diameter of tile second inner ring raceway.

In operation, the basic dynamic load rating in the rolling member row portion with respect to the second inner ring raceway where a larger load is applied than in the rolling member row portion with respect to the first inner ring raceway, can be larger than the basic dynamic load rating in the rolling member row portion with respect to the first inner ring raceway.

And, since the lives of the rolling members on the axially outer row can be secured with the balls, and not with the rollers, the balls produced less expensively than the rollers are used for the rolling members on tile axially outer row.

Accordingly, the design to equalize the lives of the both rolling member row portions at a lower cost without enlarging the outer diameter is easy, and the design with no useless portion is possible.

Now, embodiments of the present invention are explained with reference to the drawings.

FIG. 1 shows a first example of the embodiments of the present invention.

Figure 2:
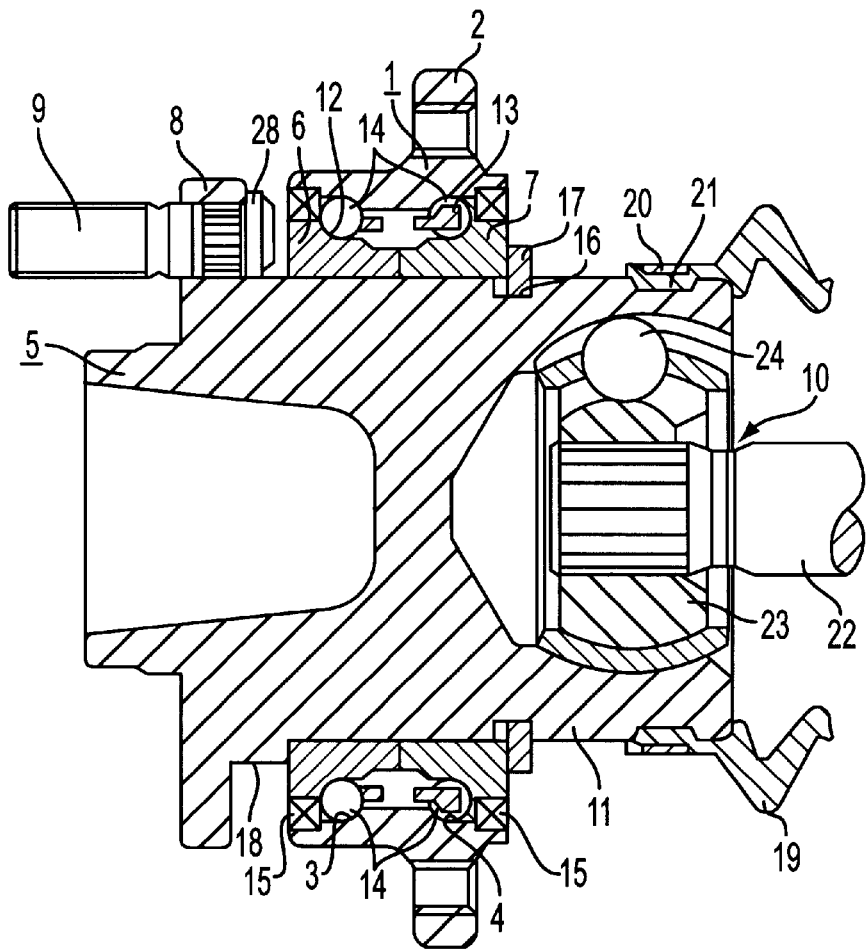
FIG. 2 is a cross sectional view of an example of the conventional structures.

The present invention is characterized in tailoring the structure of the rolling bearing section of the rolling bearing unit for vehicle wheel, and the structure and function of the other portions are substantially the same as those of the conventional ones as FIG. 2. Accordingly, like numerals are added to like members, and redundant descriptions are omitted, and the characteristic portions and different portions over the conventional structure are focused.

The rolling bearing unit for vehicle wheel of the present invention comprises an outer ring $1a$ to be supported by the suspension, a hub $5a$ provided radially inside the outer ring $1a$ for fixing the vehicle wheel, and a double row rolling bearing to rotatably support the hub $5a$.

The double row rolling bearing comprises a first rolling member row having balls $25$ for the rolling members between the first outer ring raceway $3a$ and the first inner ring raceway $12a$, which are located on the widthwise outside when installed in the automobile, and a second rolling member row having tapered rollers $26$ for the rolling members between the second outer ring raceway $4a$ and the second inner ring raceway $13a$, which are located on the widthwise inside when installed in the automobile. In other words, a tapered roller bearing is provided in the rolling member row on the widthwise inside (right side in FIG. 1) of the double row rolling bearing.

The rolling bearing unit has further an inner ring $27$ on a portion of the middle portion closer to the axially inner end of the hub $5a$, which is formed on its outer peripheral surface with a second inner ring raceway $13a$ in a conical convex surface shape.

The outer ring $1a$ has an inner peripheral surface at the axially inner end portion formed with a second outer ring raceway $4a$ facing the second inner ring raceway $13a$ and formed in a conical concave surface shape.

The tapered rollers $26$ are rotatably provided between the second inner ring raceway $13a$ and the second outer ring raceway $4a$ to form the tapered roller bearing.

The second inner ring raceway $13a$ in the conical convex surface shape and the second outer ring raceway $4a$ in the conical concave surface shape are tilted such that it goes radially inside as it goes outward in the axial directions (right and left directions in FIG. 1).

With the double row rolling bearing, the rolling member row on the widthwise outside (left in FIG. 1) is an angular type ball bearing. Accordingly, the first inner ring raceway $12a$ for the rolling member row portion on the axial outside is directly formed on the outer peripheral surface at the middle portion of the hub $5a$. A plurality of balls $25$ are provided between the first inner ring raceway $12a$ and the first outer ring raceway $3a$ formed on the inner peripheral surface at the axially outer end portion of the outer ring $1a$ to form the angular type ball bearing.

In the example illustrated, the first inner ring raceway $12a$ is directly formed on the outer peripheral surface of the hub $5a$, the diameter of the first inner ring raceway $12a$ is smaller than the diameter of the second inner ring raceway $13a$ formed on the outer peripheral surface of the inner ring $27$. Accordingly, the diameter of the first outer ring raceway $3a$ facing the first inner ring raceway $12a$ is smaller than the diameter of the second outer ring raceway $4a$. In addition, the diameter of the axially outer end portion of the outer ring $1a$ where the first outer ring raceway $3a$ is formed is smaller than the diameter of the axially inner end portion of the outer ring $1a$ where the second outer ring raceway $4a$ is formed. Consequently, by that amount, the pitch circle diameter of the studs $9$ provided on the flange $8$ of the hub $5a$ is made smaller so long as no interference is caused between the heads $28$ of the studs $9$ and the outer peripheral surface at the axially outer end of the outer ring $1a$, so that the compact and lightweight rolling bearing unit can be achieved.

With the outer peripheral surface of the hub $5a$, the diameter of the portion axially inward than the first inner ring raceway $12a$ is smaller than the diameter of the inscribing circle of the balls $25$ mating with the first inner ring raceway $12a$. This is because the hub $5a$ can be inserted into the outer ring $1a$ in the state where the seal ring $15$ is fixedly fitted into the inner peripheral surface at the axially outer end portion of the outer ring $1a$, while the balls $25$ are installed on the radially inside of the first outer raceway $3a$ on the inner peripheral surface at the axially outer end portion of the outer ring $1a$ when the rolling bearing unit is assembled.

A concave groove portion $29$ is formed generally along the circumference on the outer peripheral surface at the middle portion of the hub $5a$ between the first inner ring raceway $12a$ and the portion onto which the inner ring $27$ is fitted so as to reduce the weight of the hub $5a$.

An anchoring groove $16$ is formed generally along the circumference of the hub $5a$ at a portion closer to the axially inner end and a stop ring $17a$ is anchored in the anchoring groove $16$, so that the inner ring $27$ fitted onto the hub $5a$ is prevented from moving toward the axially inside so as to keep at a proper value the preload applied to the tapered rollers $26$ and the balls $25$ rotatably provided between the first and second inner ring raceways $12a$, $13a$ and the first and second outer ring raceways $3a$, $4a$, respectively. In this example, the stop ring $17a$ comprises a pair of semicircular stop ring elements $30$, by which the inner ring $27$ is pressed axially outward with reference to the hub $5a$ to make the inner peripheral edge portion of the elements $30$ engaged with the anchoring groove $16$ to provide the balls $25$ and the tapered rollers $26$ with the proper preload.

Even after the force pressing the inner ring $27$ axially outward is released, the balls $25$ and the tapered rollers $26$ are subjected to the proper preload by selectively using the stop ring elements $30$ of a proper thickness.

Specifically, a various kinds of stop ring elements $30$ with slightly different in thickness are prepared, and the stop ring elements $30$ with the most proper thickness are selected with respect to the dimensions of the parts of the rolling bearing unit such as groove width of the anchoring groove $16$, for engagement of the anchoring groove $16$. Accordingly, by engaging the stop ring elements $30$ with the anchoring groove $16$, after the pressing force is released, the inner ring $27$ is prevented from moving toward the axially inner end, and thus the proper preload is kept to be applied to the rolling members $14$.

In order to prevent the pair of stop elements $30$ from moving radially outward and to prevent the stop ring elements $30$ from being erroneously taken off from the anchoring groove $16$, part of the boot $19a$ is provided around the pair of stop ring elements $30$. The boot $19a$ is provided to prevent the foreign matter such as rain water, dust from entering the constant velocity joint comprising the housing portion $11$ on the axially inner end portion of the hub $5a$, and is integrally formed with a resilient material such as rubber and synthetic resin, such that the intermediate portion is formed in a bellows shape with the opposite end portions in a cylindrical shape. The outer end of the boot $19a$ is fitted onto the axially inner end portion of the hub $5a$, and retained on the outer peripheral surface at the axially inner end of the hub $5a$ by the retaining band $20$, so that the inner peripheral surface at the axially outer end of the boot $19$ is generally circumferentially engaged with the engagement groove $21$ on the outer peripheral surface at the axially inner end of the housing portion $11$.

With the axially outer end edge portion of the boot 19a, the portion projecting axially outward from the retaining band 19 is formed in a crank shape to form a retaining portion 31 along the whole circumference.

The retaining portion 31 comprises a smaller cylindrical portion 32 fitted onto the axially inner end portion of the hub 5a and a circular ring portion 33 bent radially outward from the axially outer end edge of the cylindrical portion 32, and a larger cylindrical portion 34 bent axially outward from the outer peripheral edge of the circular ring portion 33. The axially outside face of the circular ring portion 33 is abutted to the axially inside surface of the stop ring 17a, and the larger cylindrical portion 34 is fitted onto the stop ring 17a.

The vehicle wheel is rotatably supported with respect to the suspension by the rolling bearing unit of the present invention in a similar manner to the conventional rolling bearing unit for the vehicle wheel.

In the case of the double row rolling bearing installed in the rolling bearing unit for the vehicle wheel of the present invention, the balls 25 are used in the rolling member row on the axial outside and the tapered rollers 26 are used in the rolling member row on the axial inside.

Accordingly, the basic dynamic load rating of the rolling member row portion on the axial inside, subjected to the larger load than the rolling member row portion on the axial outside, can be larger than the basic dynamic load rating of the rolling member row portion on the axial outside. Accordingly, the design to equalize the lives of the both rolling member row portions is easy and the design with no useless portion is possible. Specifically, the life of the rolling member row on the axial inside, expires before the rolling member row on the axially outside still has a margin of life in the conventional structure, which is a useless portion of design and avoided by the present invention.

As mentioned above, the first inner ring raceway 12a is directly formed on the outer peripheral surface at the middle portion of the hub 5a, and the pitch circle diameter of the balls 25 of the rolling member row on the axial outside is smaller than the pitch circle diameter of the tapered rollers 26 of the rolling member row on the axial inside, and by that amount, the basic dynamic load rating of the rolling member row portion on the axial outside can be reduced. Accordingly, by controlling the basic dynamic load rating of the both rolling member row portions, the design to substantially equalizing the lives of the rolling member rows can be easily achieved.

What is claimed is:

1. A rolling bearing unit for a vehicle wheel comprising an outer ring having an outer peripheral surface formed with a mount portion to be connected to a suspension, and an inner peripheral surface formed with first and second outer ring raceways, a hub having an outer peripheral surface formed, at an axial one end side portion, with a portion axially projecting from the outer ring and having a flange to securely fix a vehicle wheel, at a middle portion, with a first inner ring raceway, and at the other axial end side portion, with a housing portion for an outer ring of a constant velocity joint, an inner ring having an outer peripheral surface formed with a second inner ring raceway and fitted onto the middle portion of the hub at a location closer to the other axial end side than the first inner ring raceway, and a plurality of rolling members rotatably provided in rows between the first and second outer ring raceways and the first and second inner ring raceways to rotatably support the hub and inner rings inside the outer ring, balls being used for the rolling members in the row with respect to the first inner ring raceway while rollers being used for the rolling members in the row with respect to the second inner ring raceway.

2. The rolling bearing unit of claim 1, wherein the balls used for the rolling members in the row with respect to the first inner ring raceway have a diameter Da while the rollers used for the rolling members in the row with respect to the second inner ring raceway have a diameter D, and the ratio of D/Da is provided from 0.5 up to 1.

* * * * *